US009841265B2

(12) United States Patent
VanValkenburgh et al.

(10) Patent No.: US 9,841,265 B2
(45) Date of Patent: Dec. 12, 2017

(54) METHOD AND APPARATUS OF MEASURING A GAP BETWEEN A FIRST AND SECOND ROLL

(71) Applicant: The Procter & Gamble Company, Cincinnati, OH (US)

(72) Inventors: Curtis Hunter VanValkenburgh, Mason, OH (US); Jeremy Georges Bertin, Bonn-Bad Godesberg (DE); Robert George Cox, Jr., Cincinnati, OH (US); Christopher Robert Lyman, Milford, OH (US); Kevin John Schmitz, Arnold, MO (US); Jon Richard Rossiter, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 617 days.

(21) Appl. No.: 14/254,367

(22) Filed: Apr. 16, 2014

(65) Prior Publication Data

US 2015/0300800 A1    Oct. 22, 2015

(51) Int. Cl.
| | |
|---|---|
| *G01B 7/15* | (2006.01) |
| *G01B 11/14* | (2006.01) |
| *G01S 17/08* | (2006.01) |
| *G01S 17/88* | (2006.01) |
| *B26D 7/00* | (2006.01) |
| *G01B 7/14* | (2006.01) |
| *B26D 1/38* | (2006.01) |

(Continued)

(52) U.S. Cl.
CPC ............ *G01B 7/15* (2013.01); *B26D 1/385* (2013.01); *B26D 5/00* (2013.01); *B26D 7/00* (2013.01); *B26D 7/265* (2013.01); *B26F 1/384* (2013.01); *G01B 7/14* (2013.01); *G01B 11/14* (2013.01); *G01S 17/08* (2013.01); *G01S 17/88* (2013.01)

(58) Field of Classification Search
CPC .. G01B 7/15; G01B 11/14; G01B 7/14; G01S 17/08; G01S 17/88; B26D 7/00
USPC ........ 324/207.17, 658; 356/614, 623, 72, 73
See application file for complete search history.

(56) References Cited

U.S. PATENT DOCUMENTS

| | | | |
|---|---|---|---|
| 3,186,275 A | 6/1965 | Obenshain | |
| 4,044,580 A | 8/1977 | Worden et al. | |

(Continued)

FOREIGN PATENT DOCUMENTS

| | | | |
|---|---|---|---|
| DE | 4203469 A1 | 8/1993 | |
| DE | 4216807 A1 | 11/1993 | |

(Continued)

OTHER PUBLICATIONS (Espacenet English Translation WO2008/043497 (A1), Lindenlauf, Cutting and/or Embossing Station, Apr. 17, 2008.*

(Continued)

*Primary Examiner* — Melissa Koval
*Assistant Examiner* — Courtney McDonnough
(74) *Attorney, Agent, or Firm* — George H. Leal; Andrew J. Hagerty; Dara M. Kendall

(57) ABSTRACT

A method and an apparatus are provided to measure a gap between a first and second roll. Moreover, a method and an apparatus are provided to correct the gap to a target distance with a closed loop system. Also, a method and an apparatus are implemented to detect the wear for each roll by using a non-contacting measuring device.

16 Claims, 7 Drawing Sheets

(51) Int. Cl.
*B26D 5/00* (2006.01)
*B26D 7/26* (2006.01)
*B26F 1/38* (2006.01)

(56) References Cited

U.S. PATENT DOCUMENTS

| | | |
|---|---|---|
| 5,409,732 A | 4/1995 | Leonard et al. |
| 5,533,371 A * | 7/1996 | Frischknecht et al. . B21B 38/10 33/657 |
| 5,581,351 A | 12/1996 | Marcus et al. |
| 6,755,940 B2 | 6/2004 | Lin et al. |
| 7,036,411 B1 | 5/2006 | Harris et al. |
| 2008/0028902 A1 | 2/2008 | Baggot et al. |
| 2008/0202304 A1 | 8/2008 | Liebheit |
| 2009/0226670 A1 * | 9/2009 | Schutz ............ B31F 1/07 428/154 |

FOREIGN PATENT DOCUMENTS

| | | |
|---|---|---|
| JP | 06281438 | 10/1994 |
| JP | 11192507 | 7/1999 |
| JP | 2004115989 | 4/2004 |
| JP | 2004277899 | 10/2004 |
| JP | 2007090396 | 4/2007 |
| JP | 2009178572 | 8/2009 |
| WO | WO 2008/043497 A1 | 4/2008 |

OTHER PUBLICATIONS

Espacenet English Translation DE4216807 (A1) Stein et al., Roller gap measurement has a sensor to register a point at the roller surface without contact which mirrors facing points in the roller gap, Nov. 25, 1993.*
PCT International Search Report, mailed May 4, 2016, 49 pages.

* cited by examiner

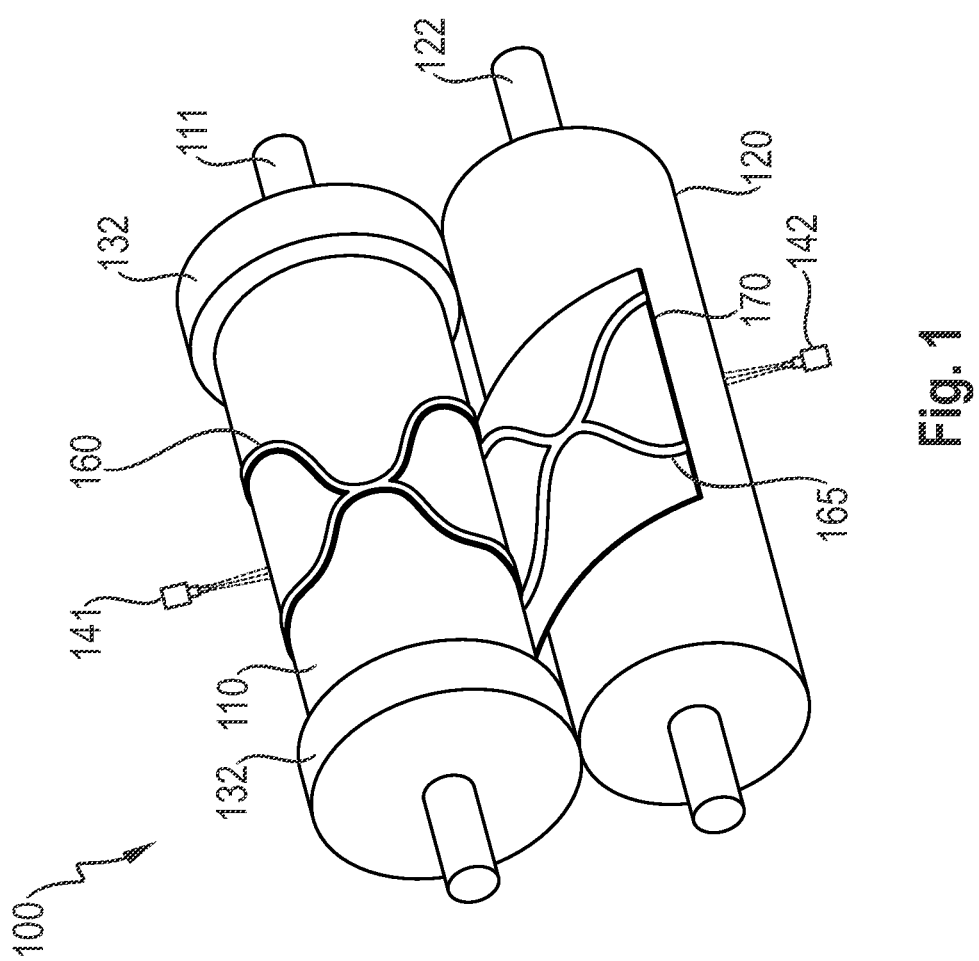

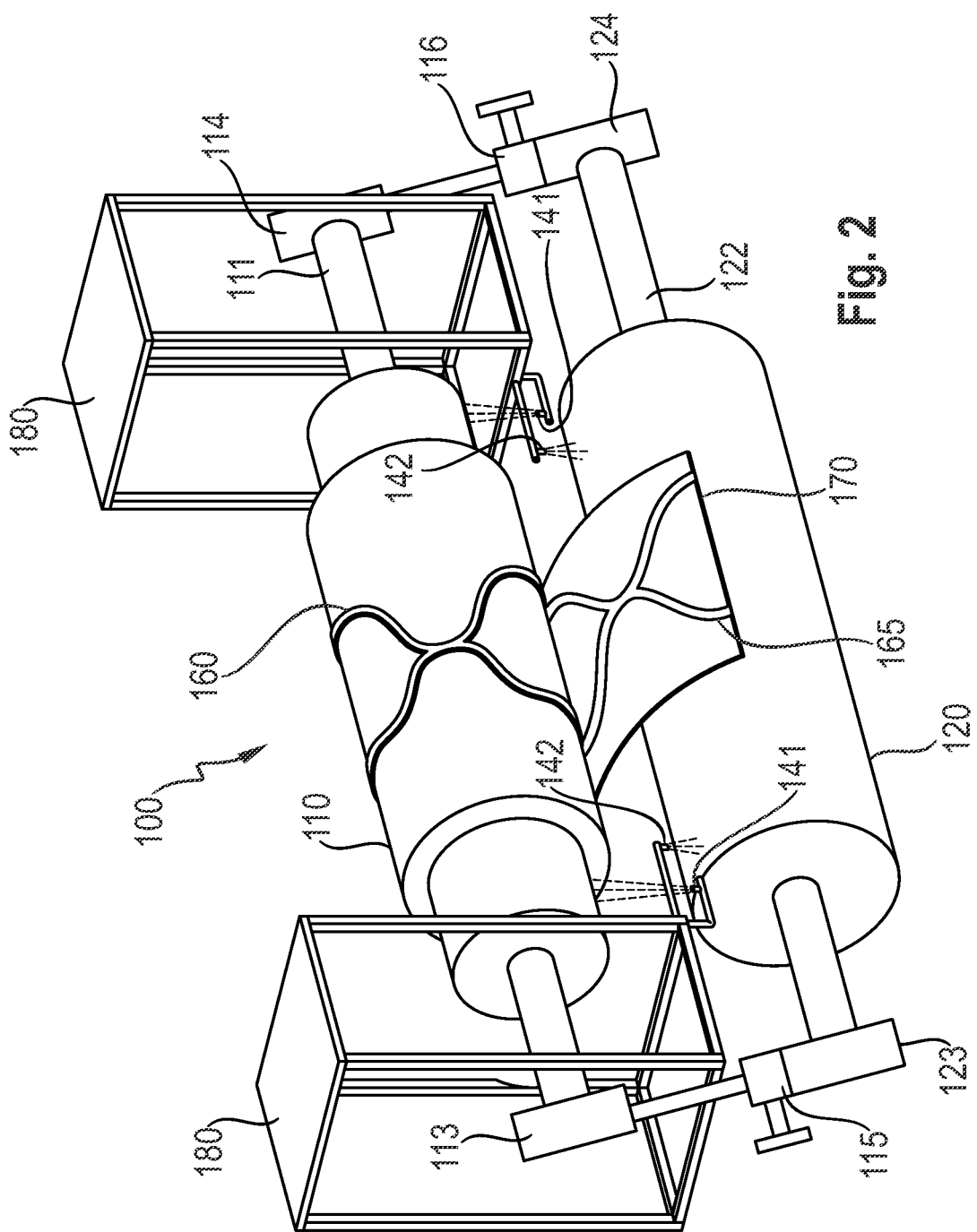

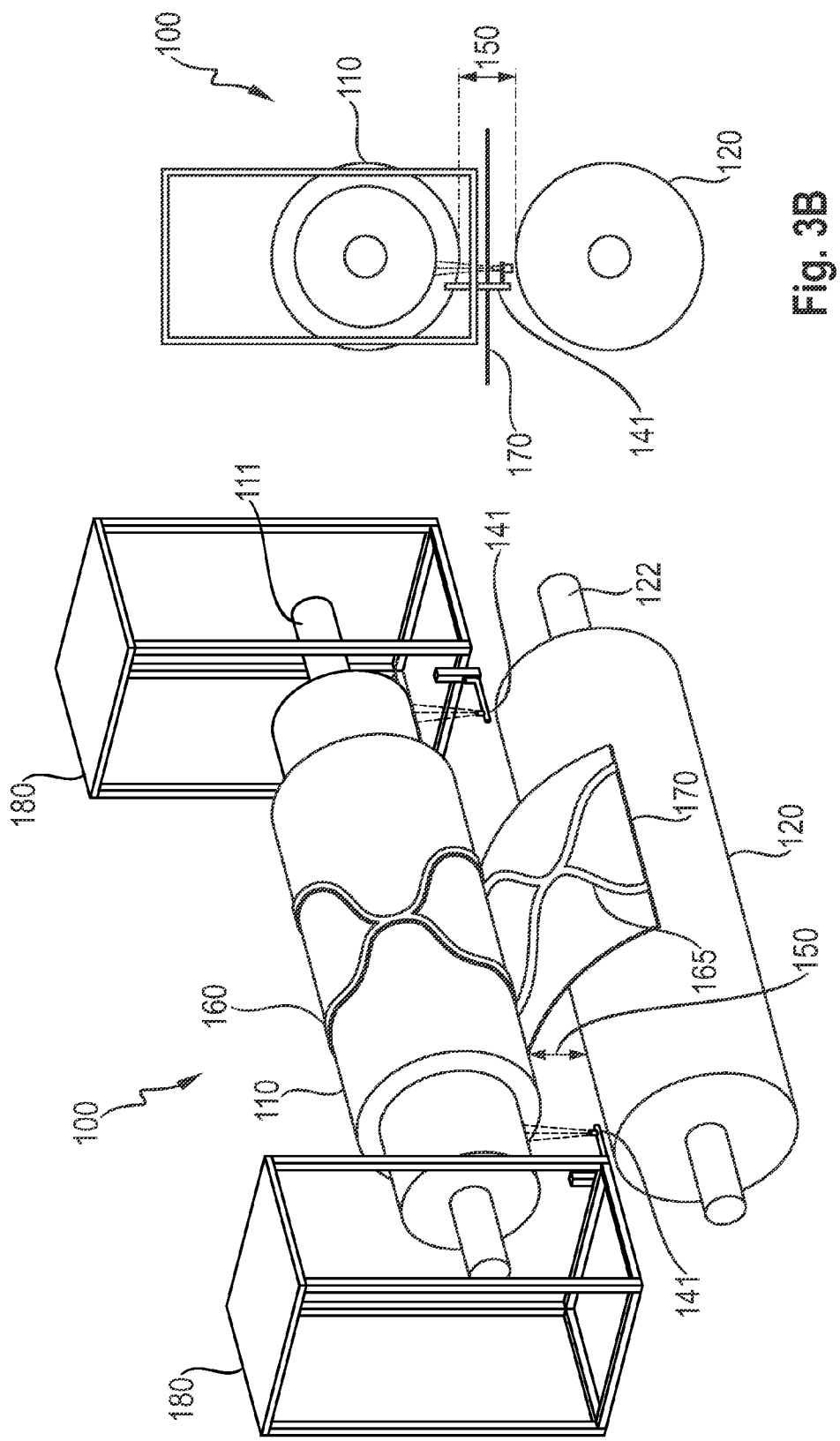

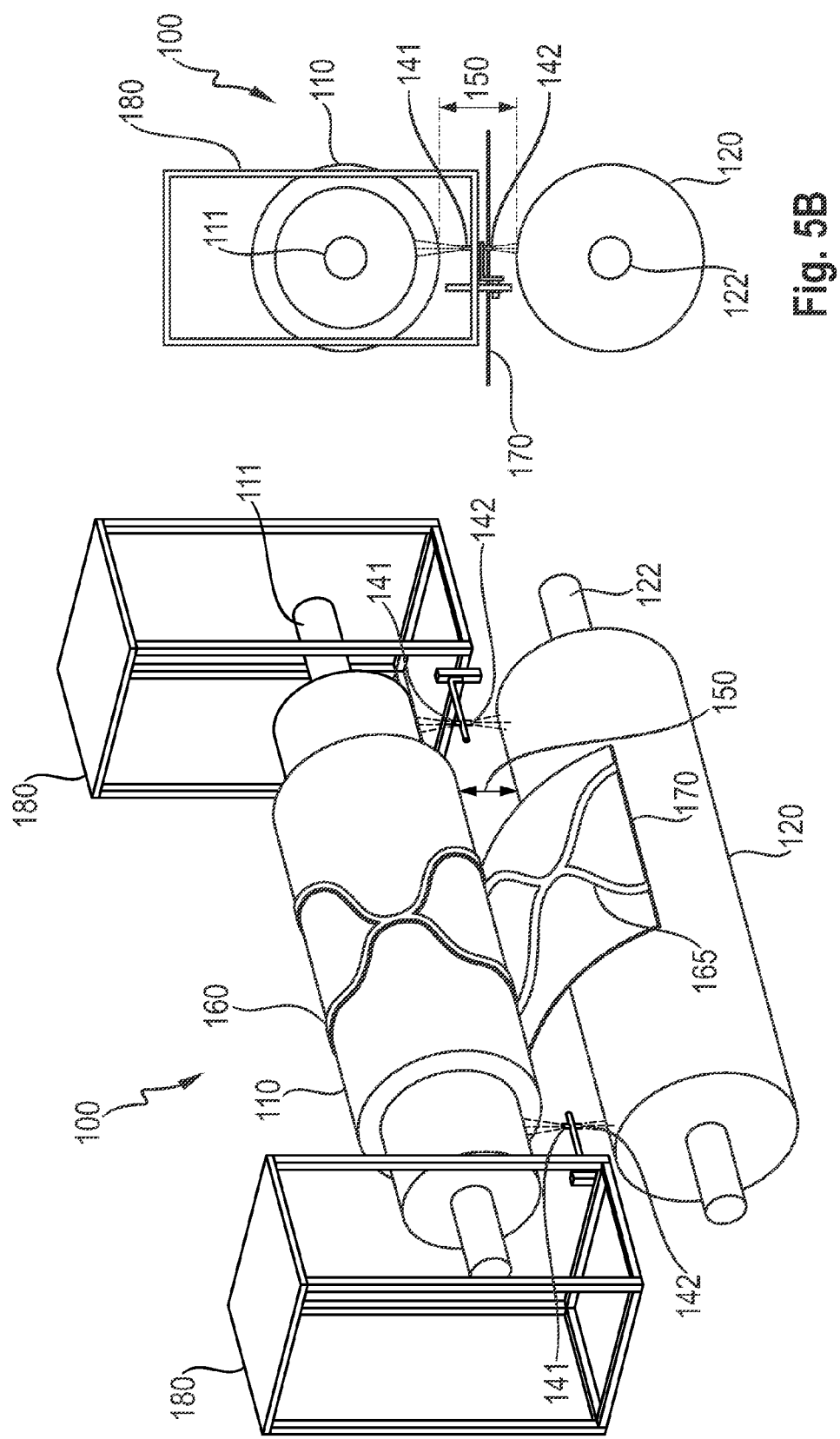

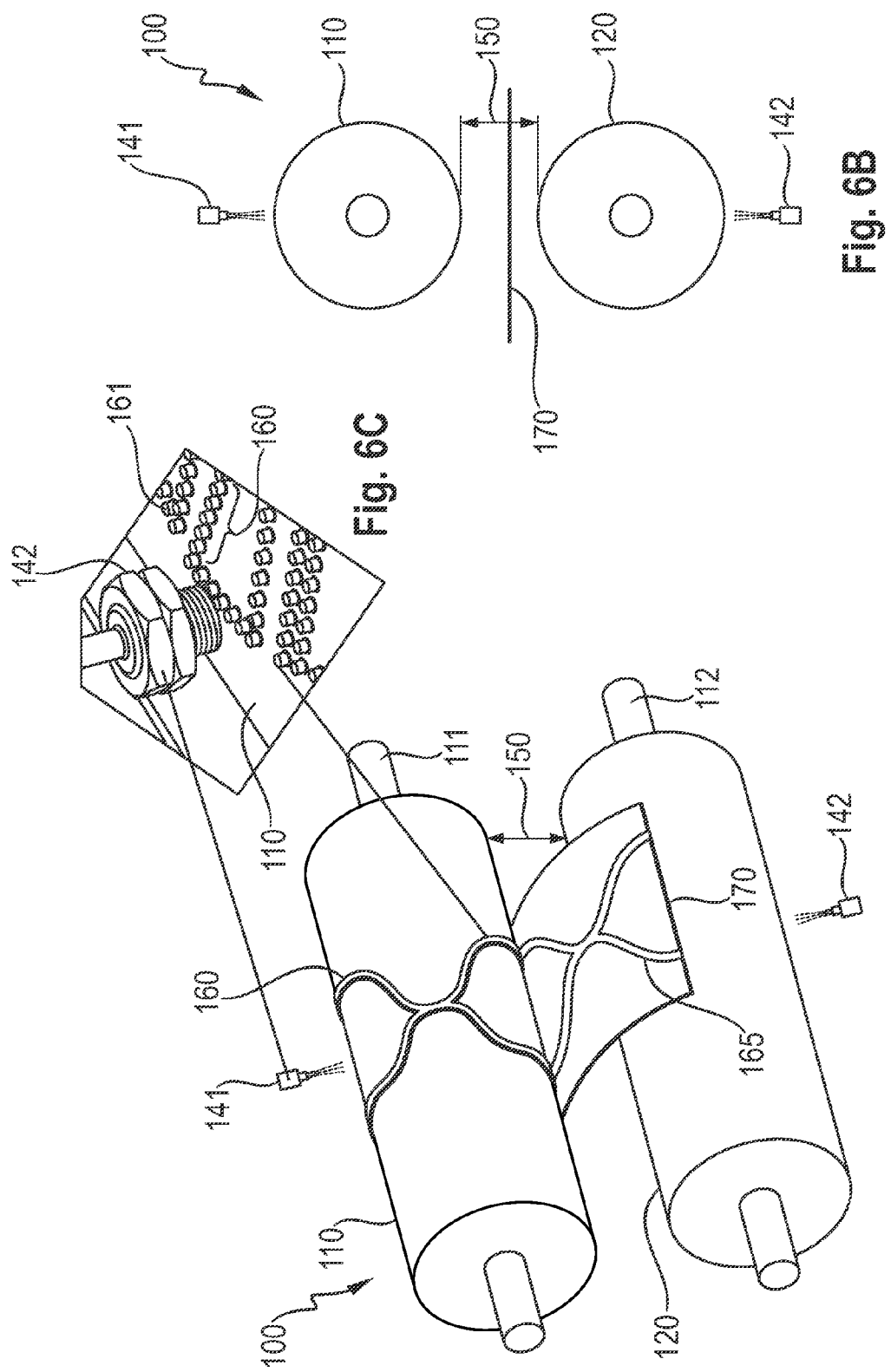

METHOD AND APPARATUS OF MEASURING A GAP BETWEEN A FIRST AND SECOND ROLL

FIELD OF THE INVENTION

The invention provides a method and an apparatus to measure a gap between a first and second roll. Moreover, the invention provides a method and an apparatus to correct the gap to a target distance with a closed loop system. The invention also provides a method and an apparatus to detect the wear of the first and/or second roll by using a non-contacting measuring device.

BACKGROUND OF THE INVENTION

A web material can undergo specific transformations when passed between a first and second roll. The first and second roll may consist of a tool roll and an anvil roll. For instance, the web material passing between the first and second roll may undergo an embossment, a cutting into separate sheets, or a coating of a layer of material, etc.

The gap between the first and second roll is critical in order to perform the desired transformation on the web material. If the gap between the first and second roll is too high in comparison to a target distance (a target gap between the first and second roll), the product or the transformation quality can be adversely affected. If the gap between the first and second roll is too low in comparison to the target distance, the first and second roll contact each other which can lead to an excessive wear of the first and second roll or even blocking of the first and second rolls.

In the industry, proper execution of an entire process may often rely upon an operator. The operator initially sets up the distance between the first and second roll such that the target distance is met. The operator sets up the initial positions of the first and second roll. During the continuous process, the operator may have to make some adjustments to reposition the first and/or second roll such that the gap between the first and second roll continuous to meet the target distance. Without knowing precisely the actual gap, the operator's actions are based on the evaluation of the product quality and "trial-and-error".

However, such adjustments can be time-consuming and require stopping the process. Also these adjustments may not be accurate, which may lead to either an unsatisfactory web transformation or to premature equipment wear.

Also, when installing the first and second roll, the operator may have to take into account the expansion of the first and second roll during the start-up due to heat generated by the apparatus itself or near-by equipment. The heat may be due to the rotation of the first and second roll. The gap between the first and second roll decreases due to the expansion in diameter of the first and second roll. As a consequence, the first and second roll may come into contact with each other, which leads to unsatisfactory transformation of the web material and an increased wear of the rolls.

There is thus a desire to develop an automated method in order to adjust the gap between the first and second roll which has been initially set-up by the operator. There is a desire that the gap between the first and second roll continuously meets the target distance and does not require the involvement of the operator.

A web cutting machine having temperature measuring and control means in order to maintain the selected cutting gap between the first and second roll has been disclosed in U.S. Pat. No. 3,186,275.

There is thus a desire to develop a method and apparatus to infer the gap between the first and second roll. The measuring device to be selected should be suited for use in a plant. Hence, the method and apparatus have to be as universal as possible to be applicable to as many types of web transformation as possible. The cost may be as low as possible. Any measuring device may have a lifetime as long as possible and hence in order also to withstand conditions in a manufacturing plant, there is a desire to select a measuring device according to its robustness against dust and debris.

Web material transformation by passing between the first and second roll is typically a continuous process. There is thus a desire to develop a method suitable for a continuous process to ongoingly correct the gap to a target distance (a target gap) in order to ensure a satisfactory web transformation without the need to stop the continuous process.

Also, there is a desire to prevent any equipment wear in order to continuously ensure a satisfactory web transformation.

SUMMARY OF THE INVENTION

A method of measuring a gap between a first and second roll comprises the steps of:
  providing a first and second roll having parallel axes of rotation, the first roll having a first position and the second roll having a second position;
  defining a gap between the first and second roll which meets a target distance between the first and second roll to allow a web material to pass through the gap;
  providing at least a first non-contacting measuring device which measures a first distance from the first non-contacting measuring device to the first roll to infer the position of the first roll;
  inferring the gap between the first and second roll from the inferred position of the first roll.

The first measuring device is selected from the group consisting of an inductive sensor, a capacitance sensor, an Eddy-current sensor, a laser triangulation displacement sensor, a confocal-chromatic sensor and combinations thereof.

A method of measuring a gap between a first and second roll comprises the steps of:
  providing a first and second roll having parallel axes of rotation, the first roll having a first position and the second roll having a second position;
  defining a gap between the first and second roll which meets a target distance between the first and second roll to allow a web material to pass through the gap;
  providing at least a first non-contacting measuring device which measures a first distance from the first non-contacting measuring device to the first roll to infer the position of the first roll;
  providing at least a second non-contacting measuring device which measures a second distance from the second non-contacting measuring device to the second roll to infer the position of the second roll;
  inferring the gap between the first and second roll from the inferred positions of the first and second roll.

The first and second non-contacting measuring devices are selected from the group consisting of an inductive sensor, a capacitance sensor, an Eddy-current sensor, a laser triangulation displacement sensor, a confocal-chromatic sensor and combinations thereof.

An apparatus for measuring a gap between a first and second roll comprises:

(a) a first and second roll having parallel axes of rotation, the first roll having a first position and the second roll having a second position and defining a gap between the first and second roll which meets a target distance between the first and second roll to allow a web material to pass through the gap;
(b) at least a first non-contacting measuring device for measuring a first distance from the first non-contacting measuring device to the first roll to infer the position of the first roll; and to thus infer the gap between the inferred position of the first roll; and
wherein the first non-contacting measuring device for inferring the gap between the first and second roll from the position of the first roll is selected from the group consisting of an inductive sensor, a capacitance sensor, an Eddy-current sensor, a laser triangulation displacement sensor, a confocal-chromatic sensor and combinations thereof.

An apparatus for measuring a gap between a first and second roll comprises:
(a) a first and second roll having parallel axes of rotation, the first roll having a first position and the second roll having a second position and defining a gap between the first and second roll which meets a target distance between the first and second roll to allow a web material to pass through the gap;
(b) at least a first non-contacting measuring device for measuring a first distance from the first non-contacting measuring device to the first roll to infer the position of the first roll; and
(c) at least a second non-contacting measuring device for measuring a second distance from the second non-contacting measuring device to the second roll to infer the position of the second roll; and to thus infer the gap between the inferred positions of the first and second rolls; and
wherein the first and second non-contacting measuring device for inferring the gap from the positions of the first and second roll are selected from the group consisting of an inductive sensor, a capacitance sensor, an Eddy-current sensor, a laser triangulation displacement sensor, a confocal-chromatic sensor and combinations thereof.

The apparatus may further have more than one first non-contacting measuring devices and/or more than one second non-contacting measuring devices.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

FIG. 1 is a perspective view of an exemplary embodiment of an apparatus according to the present invention wherein the first roll comprises bearer rings and wherein the first non-contacting measuring device is positioned on top of the first roll and the second non-contacting measuring device is positioned below the second roll;

FIG. 2 is a perspective view of an exemplary embodiment of an apparatus according to the present invention comprising adjustable spacer blocks between the bearer blocks of the first and second roll and wherein a first and second non-contacting measuring device are positioned side by side;

FIG. 3A is a perspective view of an exemplary embodiment of an apparatus according to the present invention wherein a first non-contacting measuring device determines a position of the first roll;

FIG. 3B is a side view of the FIG. 3A of an apparatus according to one non-limiting embodiment of the present invention;

FIG. 5A is a perspective view of an exemplary embodiment of an apparatus according to the present invention wherein a first and second non-contacting measuring device are positioned back to back;

FIG. 5B is a side view of the FIG. 5A of an apparatus according to one non-limiting embodiment of the present invention;

FIG. 6A is a perspective view of an exemplary embodiment of an apparatus according to the present invention wherein the first non-contacting measuring device is positioned on top of the first roll and the second non-contacting measuring device is positioned below the second roll;

FIG. 6B is a side view of the FIG. 6A of an apparatus according to one non-limiting embodiment of the present invention;

FIG. 6C is a zoomed view of the first roll together with the first non-contacting measuring device;

DETAILED DESCRIPTION OF THE INVENTION

Definition of Terms

Figures 4A, 4B:
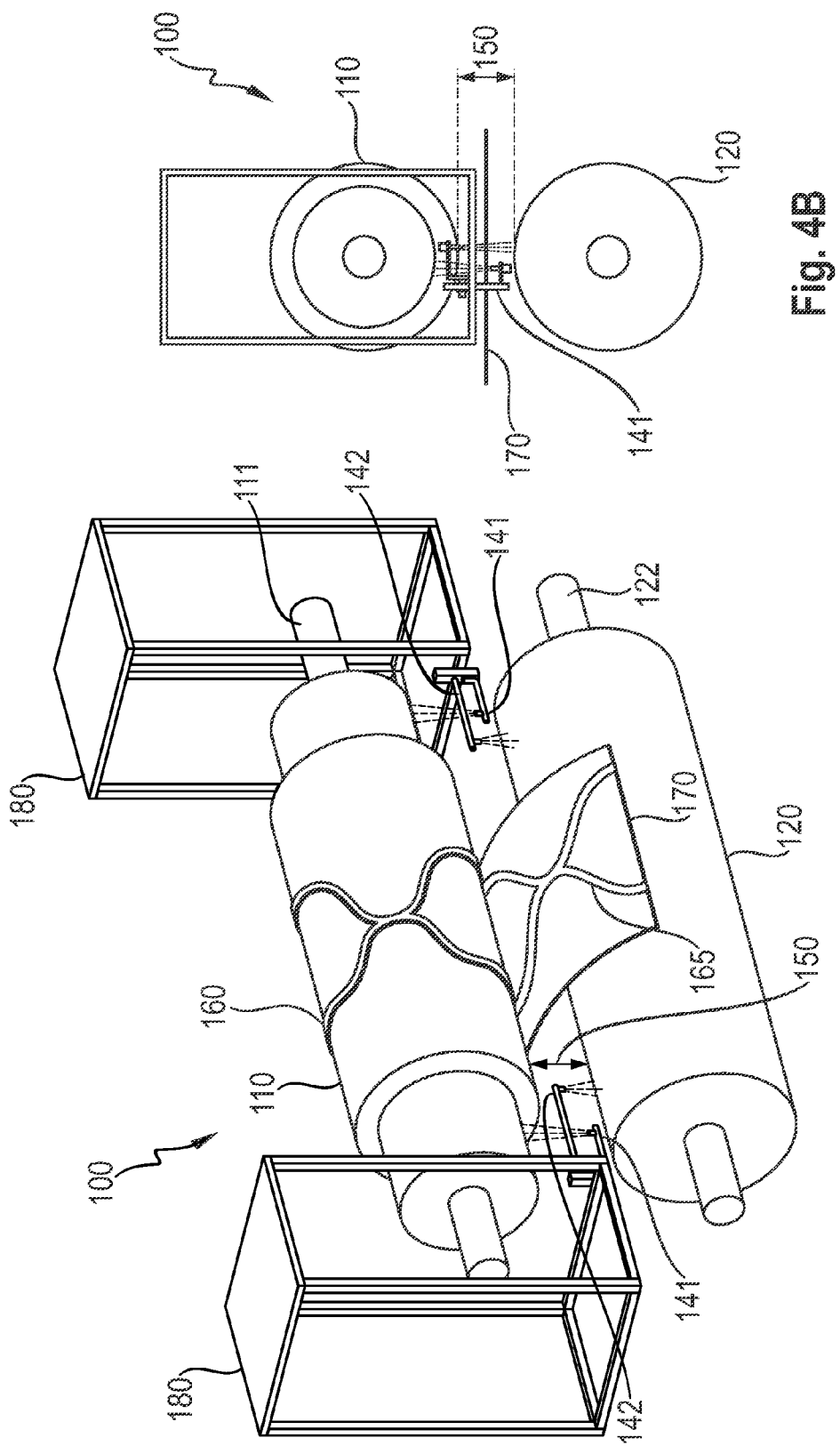
FIG. 4A is a perspective view of an exemplary embodiment of an apparatus according to the present invention wherein a first and second non-contacting measuring device are positioned side by side.
FIG. 4B is a side view of the FIG. 4A of an apparatus according to one non-limiting embodiment of the present invention.

The term "actuator" as used herein refers to a type of motor which facilitates a linear movement of the first and/or second roll such that the gap between the first and second roll continuously meets the target distance. An actuator is operated by a source of energy, typically electric current, hydraulic fluid pressure, or pneumatic pressure, and converts that energy into motion. Typical actuators are mechanical, hydraulic, pneumatic, electro-mechanical, or linear actuators.

The term "capacitance" as used herein refers to the ability of a body to store an electrical charge.

The term "Eddy-current" as used herein refers to electric currents which are induced within conductors by a changing magnetic field in the conductor. These circulating eddies of current have inductance and thus induce magnetic fields. These fields can cause repulsive, attractive, propulsion, drag and heating effects. The stronger the applied magnetic field, or the greater the electrical conductivity of the conductor, or the faster the field changes, the greater the currents that are developed and the greater the fields produced.

The term "non-contacting measuring device" as used herein refers to a sensor which contacts neither the first roll nor the second roll. A non-contacting measuring device is able to infer the actual distance from the non-contacting measuring device to a roll. When focused at the surface of the roll, the non-contacting measuring device may measure the entire circumference of the roll when the roll rotates. Hence, a continuous profile of the circumference of the roll is obtained. The non-contacting measuring device is thus effective at measuring a change of position of the first or second roll by comparing the continuous profile of the circumference of the roll to the initial profile of the circumference.

The term "inductance" as used herein refers to the property of a conductor by which a change in current in the conductor "induces" (creates) a voltage (electromotive force) in both the conductor itself (self-inductance) and in any nearby conductors.

Method for Measuring a Gap Between a First and Second Roll

A method of measuring a gap 150 between a first and second roll 110, 120 comprises the step of providing a first and second roll 110, 120 having parallel axes of rotation 111, 122. The first roll 110 has a first position. The second roll 120 has a second position. The first and second roll 110, 120 define a gap 150. The gap 150 meets a target distance between the first and second roll 110, 120 to allow a web material 170 to pass through the gap 150.

The first and second roll 110, 120 may perform a transformation on the web material 170. The first roll 110 may be a tool roll whereas the second roll 120 may have a smooth surface. A tool roll generally has a profiled surface. Alternatively, the first and second roll 110, 120 may both have a smooth surface.

The tool roll 110 may cut the web material 170. Known cutting rolls may be selected from the group consisting of a rotary die cutting roll, flex knife cutting roll and shear cutting roll. The die cutting roll 110 can comprise at least one cutting member for cutting the web material 170 against the anvil roll 120.

The tool roll 110 may be a patterned roll for embossing or bonding of a web material 170. The tool roll 110 may be used for embossing when the objective is to create a recessed pattern in relief on the web material 170. Alternatively, the tool roll 110 may be used for heat and/or pressure bonding by fusing the fibers together of the web material 170 which it may be made of.

To maintain the web material 170 in place during the process or direct the web material 170 into a specific direction, the first and second roll 110, 120 may both have smooth surfaces.

Alternatively, the first and second roll 110, 120 may be intermeshing rolls. In case of a pair of intermeshing rolls, the first and second roll 110, 120 are rotating substantially parallel to each other. The first roll 110 comprises a plurality of circumferential first ridges and circumferential first grooves on its surface. The second roll 120 comprises a plurality of circumferential second ridges and second grooves on its surface. In operation, the first and second roll 110, 120 intermesh such that the plurality of the first ridges of the first roll 110 extend into the plurality of the second grooves of the second roll 120 and the plurality of the second ridges of the second roll 120 extend into the plurality of the first grooves of the first roll 110.

The first and second roll 110, 120 may comprise bearer blocks and further comprise bearer rings. Alternatively, the first and second roll 110, 120 may comprise adjustable spacer blocks or non-adjustable spacer blocks between the bearer blocks of the first and second roll 110, 120. A bearer ring is a larger diameter ring on each edge of the parallel axe 111 of the first and/or second roll 110, 120. FIG. 1 shows an example of a bearer ring of the first roll 110. The bearer rings 131, 132 of the first roll 110 may come into contact with the second roll 120. As shown in FIG. 2, the first and second roll 110, 120 may comprise bearer blocks 113, 114, 123, 124 without bearer rings but with adjustable spacer blocks 115, 116 or non-adjustable spacer blocks between the bearer blocks of the first and second roll 110, 120. These alternatives may provide improved stability to the first and second roll 110, 120. The apparatus is pressure balanced because the load of the first and second roll 110, 120 is distributed through the bearer rings or the blocks. Hence the parallel axes 111, 122 of the first and second roll 110, 120 are not easily displaced significantly during any transformation of the web material 170.

The gap 150 between the first and second roll 110, 120 is important to achieve the correct transformation of the web material 170. The gap 150 has an optimal operating window outside of which the transformation of the web material 170 may be not achieved any more. Also, if below the target distance, the web material 170 may be damaged. The optimal operating window is thus a target distance to be met by the gap 150 between the first and second roll 110, 120.

The inventors have found a new method and apparatus to infer the gap 150 by determining the position of the first and/or second roll 110, 120. The method comprises the step of providing at least a first non-contacting measuring device 141. The first non-contacting measuring device 141 measures a first distance from the first non-contacting measuring device 141 to the first roll 110.

The first non-contacting measuring device 141 focuses at the surface of the first roll 110. When the first roll 110 rotates, the first non-contacting measuring device 141 can measure a complete circumference of the first roll 100 in a given region of the first roll 110. This circumference of the first roll 110 may include protuberances or depressions. A profile of the circumference of the first roll 110 is obtained which is linked to the first distance from the first non-contacting measuring device 141 to the first roll 110, hence allowing inferring the current position of the first roll 110. By measuring the first distance from the first non-contacting measuring device 141 to the surface of the first roll 110, it is thus possible to determine the actual position of the first roll 110 and thereby subsequently infer the gap 150 from the position of the first roll 110.

The first non-contacting measuring device 141 may be positioned outboard of the first roll 110, as long as it can be unimpededly focused on the first roll 110. The first non-contacting measuring device 141 may be advantageously positioned at any discrete place in proximity to the first roll 110. The first non-contacting measuring device 141 may be advantageously positioned within the gap 150 between the first and second roll 110, 120 to be measured. The first non-contacting measuring device 141 can be small e.g. less than 0.5 mm in thickness and less than 5 mm in diameter or width in order to be embedded in any wands or brackets of the apparatus. Such small first non-contacting measuring device 141 is useful when there are space constraints and the gap 150 between the first and second roll 110, 120 is difficult to access. Because there is no physical contact with the surface of the first roll 110, the first non-contacting measuring device may also be easily removed and mounted on another apparatus in comparison to other known measuring devices which are mounted to the roll and rotate with the roll. In that case, such known measuring devices are typically supplied with the corresponding roll, which reduces flexibility for the apparatus.

The distance from the first non-contacting measuring device 141 to the first roll 110 results in the inference of the position of the first roll 110. The gap 150 between the first and second roll 110, 120 is thus inferred from the inferred position of the first roll 110.

FIG. 3A is a perspective view of an apparatus 100 which comprises a first and second roll 110, 120. The first and second roll 110, 120 have parallel axes of rotation 111, 122. The first and/or second roll 110, 120 may be mounted within a frame 180. The first and second roll 110, 120 define a gap 150 between the first and second roll 110, 120 whereby a web material 170 passes through the gap 150. The first and second roll 110, 120 may perform a material transformation on the web material 170. In FIG. 3A, the first roll 111 may be patterned roll which may be used to pattern-bond or pattern-emboss a specific pattern 160 to the web material 170.

In FIGS. 3A and 3B, each frame 180 comprises a first non-contacting measuring device 141. The first non-contacting measuring device 141 may be securely screwed into place within the frame 180 and out of the web material's 170 path. Only one first non-contacting measuring device 141 may be enough to exactly infer the gap between the first and second roll by determining the position of the first roll 110. However, using two first non-contacting measuring devices 141 positioned on both sides of the first roll 141 may be advantageous to measure the distance from a first non-contacting device 141 to the first roll 110 at two different locations of the first roll surface along the axis of rotation 111 of the first roll 110. Indeed, it is possible to average the signals obtained by the first non-contacting measuring devices 141 in order to minimize the background noise.

For example, it will be desirable to have more than one first non-contacting measuring devices 141 in case that thermal expansion or contraction occurs at the first roll 110. Thermal expansion or contraction may be heterogeneous across the surface of the first roll 110. Hence, using more than one first non-contacting measuring devices 141 may minimize any potential inaccuracies which might result from the change in diameter of the first roll 110 at different locations of the first roll 110.

Using more than one first non-contacting measuring devices 141 may be especially beneficial for large first rolls 110, i.e. rolls with a large dimension along their longitudinal axis.

The first non-contacting measuring device 141 is selected from the group consisting of an inductive sensor, a capacitance sensor, an Eddy-current sensor, a laser triangulation displacement sensor, a confocal-chromatic sensor and combinations thereof.

Inductive Sensor

An inductive sensor comprises an induction loop. Electric current generates a magnetic field, which collapses generating a current that falls asymptotically toward zero from its initial level when the input electricity ceases. The inductance of the loop changes according to the material inside it. The presence of metal increases the current flowing through the loop. This change can be detected by sensing circuitry, which can signal to a controller whenever metal is detected. The inductive sensor may be commercially available with speeds of up to 40 kHz which has the potential to be sufficient for measuring the gap 150.

The inductive sensor is an electronic proximity sensor, which detects magnetic metallic objects without touching them. The magnetic fields generated by the inductive sensor are not affected by non conducting materials. Hence, any prevalent glue, oil, water or dust that might stick to the inductive sensor will not be detected by the inductive sensor.

The inductive sensor may also endure heat generated from the online continuous process. The inductive sensor is able to withstand relatively high temperatures as long as the temperatures remain fairly constant, about ±4° C. Alternatively, the inductance sensor may have onboard any temperature compensation system in order to withstand temperature fluctuations.

Consequently, the inductive sensor is relatively resistive to dirt, dust, oil and temperatures. The inductive sensor is therefore a first non-contacting measuring device which is robust and plant durable.

Eddy-Current Sensor

Eddy-currents also called Foucault currents are electric currents induced within conductors by a changing magnetic field in the conductor. Eddy-current sensors as inductive sensors use thus magnetic fields for sensing. The Eddy-current sensors may determine the position of a roll even if the roll may be made of a material which has no magnetic properties.

Eddy current sensors may be designed for non-contact displacement, distance, movement and position measurements, but also for registering oscillations and vibrations. These sensors are a good choice when high precision is needed; Eddy current sensors may thus be used for high-precision nanometer measurements.

As magnetic fields are not affected by non-conductive contaminants, such as dust, water, oil or web material such as fibrous structures, Eddy-current sensors are also plant durable and robust.

Capacitance Sensor

A capacitance sensor is able to detect the electrical charge which is stored in the first roll 110. The capacitance sensor detects conducting materials. The capacitance sensor comprises two plate electrodes which are represented by the capacitance sensor itself and the opposing measurement object which is the surface of the roll. If a constant alternating current flows through the capacitance sensor, the amplitude of the alternating voltage on the capacitance sensor is proportional to the distance from the capacitance sensor to the surface of the roll. The alternating current is demodulated and output as, for example, an analog signal. The capacitance sensor may measure against all electrically conductive materials regardless of their permeability, resistivity and thickness.

In some applications, the distance which is measured between the capacitance sensor and the surface of the roll may become contaminated by dust, and other materials which might adversely affect the accuracy of the measurement. Capacitance sensors generate an electric current. Any contaminant between the capacitance sensor and the surface of the roll may interfere with the signal, depending on the dielectric constant of the contaminant. Hence, the detected surface of the first or second roll 110, 120 may be clean when using the capacitance sensor compared to the inductive sensor and Eddy-current sensor.

The capacitance sensor may be advantageously subjected to high shock loads (ca. 5 kg) and intense vibratory environments while keeping high precisions in distance measurements in the sub-micron ranges. The capacitance sensor may be used advantageously at relatively high temperatures. The capacitance sensor has indeed a constant sensitivity over a relatively wide temperature range.

Another advantage of the capacitance sensor may be the size. The capacitance sensor may have a thickness of about 1 mm or less. The capacitance sensors may thus be nested in a very small location.

Laser Triangulation Displacement Sensor

A laser diode in the laser triangulation displacement sensor produces short laser pulses which are projected onto the surface of the roll. The light reflected from the surface of the roll is recorded by the laser triangulation displacement sensor. The time of flight of the light pulse to the roll and back the laser triangulation displacement sensor can be correlated to the distance from the roll to the laser triangulation displacement sensor. A laser triangulation displacement sensor suitable for the present invention may be commercially available at Keyence, e.g. LK-H057 model. The laser triangulation displacement sensor is able to measure any distance changes in the sub-micron range with a resolution from 0.025 mm and also against critical surfaces such as hot surfaces without any contact to the roll.

Some interference in a spotlight of the laser triangulation displacement may occur due to the surface roughness of the roll. For instance, some interference in the sub-micron range may occur especially in case of objects with a metallic luster. This specific effect may make it difficult to carry out measurements on any metallic surfaces. In order to remedy to such interference, the laser triangulation displacement sensor may include special lenses to expand the laser point to a short oval point. By using a special algorithm, the laser triangulation displacement sensor averages the surface property of the roll to filter any interference and obtain a precise and stable distance from the laser triangulation displacement sensor to the surface of the roll.

Confocal-Chromatic Sensor

Polychromatic white light is focused onto the surface of the roll by a multilens optical system. The lenses are arranged so that the white light is dispersed into a monochromatic light by controlled chromatic aberration. A specific distance from the confocal-chromatic sensor to the surface of the roll is assigned to a wavelength of the monochromatic light by a factory calibration. Only the wavelength which is exactly focused on the surface of the roll is used for the measurement. This light reflected from the surface of the roll is passed through a confocal aperature onto a spectrometer which detects and processes the spectral changes. The confocal-chromatic sensor is thus not contacting the roll.

The first non-contacting measuring device 141 is therefore selected depending on its robustness to the environment. The first non-contacting measuring device 141 may indeed resist to environment changes such as dust, debris or wear. The first non-contacting measuring device may be advantageously an inductive sensor because the inductive sensor is immune to dirt, dust, and oil.

The first non-contacting measuring device 141 is able to measure any distances changes in the sub-micron range with a great flexibility about the placement of the first non-contacting measuring device 141.

The first non-contacting measuring device 141 is also able to deliver a clear signal of the measured gap 150 between the first and second roll 110, 120. In order to deliver a clear signal, the first non-contacting measuring device 141 may have an optimized bandwidth to capture any slow change of the gap 150 without further filtration of the measured data.

Each first non-contacting measuring device 141 may be also able to filter the measured data by removing any background noise and also by manipulating the raw data, e.g. summing or subtracting the measured signals obtained from two first non-contacting measuring devices 141, applying a specific transfer function which leads to a measurement of the gap 150 between the first and second roll 110, 120.

Alternatively, a method of measuring a gap 150 between a first and second roll 110, 120 comprises the step of providing a first and second roll 110, 120 having parallel axes of rotation 111, 122. The first roll 110 has a first position. The second roll 120 has a second position. The first and second roll 110, 120 define a gap 150. The gap 150 meets a target distance between the first and second roll 110, 120 to allow a web material 170 to pass through the gap 150. The method comprises the step of providing at least a first non-contacting measuring device 141. The first non-contacting measuring device 141 measures a first distance from the first non-contacting measuring device 141 to the first roll 110 in order to infer the position of the first roll 110.

The method further comprises the step of providing at least a second non-contacting measuring device 142. The second non-contacting measuring device 142 measures a second distance from the second non-contacting measuring device 142 to the second roll 120 in order to infer the position of the second roll 120. The gap 150 between the first and second roll 110, 120 is thus inferred from the position of the first and second roll 110, 120.

The same reasons as set out above for the first non-contacting measuring device 141 also apply to the second non-contacting measuring device 142. The first and second non-contacting measuring device 141, 142 are selected from the group consisting of an inductive sensor, a capacitance sensor, an Eddy-current sensor, a laser triangulation displacement sensor, a confocal-chromatic sensor and combinations thereof.

The first and second non-contacting measuring device 141, 142 may be positioned side by side within the frame 180, as shown in FIGS. 4A and 4B. The first and second non-contacting measuring device 141, 142 may be securely attached into place within the frame 180 and out of the web material's 170 path.

Each first and second non-contacting measuring device 141, 142 may detect the surface of the respective first and second roll 110, 120. The first non-contacting measuring device 141 may be focused on the surface of the first roll 110. The second non-contacting measuring device 142 may be focused on the surface of the second roll 120 and may be positioned in a back-to-back position relative to the first non-contacting measuring device 141. The first non-contacting measuring device 141 may measure a first distance from the first non-contacting measuring device 141 to the first roll 110. The second non-contacting measuring device 142 may measure a second distance from the second non-contacting measuring device 142 to the second roll 120. The gap 150 between the first and second roll 110, 120 is thus inferred.

FIGS. 5A and 5B are examples of a back-to-back position of the first and second non-contacting measuring devices 141, 142. The first and second non-contacting measuring device 141, 142 may thus focus in opposite directions, respectively, to the first and second roll 110, 120. Such assembly is a suitable arrangement in order to address any potential space constraints because such assembly allows gaining space, especially when the first and second non-contacting measuring device 141, 142 has the shape of a flat wafer.

When rotating, the first and/or second roll 110, 120 may be subjected to thermal expansion or thermal contraction. Indeed, the first and second roll 110, 120 may expand due the heat generated at the start-up when the first and second roll 110, 120 rotates. The expansion of the first and second roll 110, 120 may be also due to the heat generated by near-by equipment.

Alternatively, any thermal contraction of the first and second roll 110, 120 may occur when the system has to be cooled or chilled. However, the first and second non-contacting measuring device 141, 142 may be calibrated to work over a relatively broad range of temperature. Also, the first and second non-contacting measuring device 141, 142 may comprise a temperature compensation system onboard in order be impervious to any temperature changes.

Overall, the method allows determining the exact position of the first and/or second roll 110, 120 without any need to interrupt the process. The gap 150 between the first and second roll 110, 120 is therefore continuously monitored during the online ongoing process.

Method for Detecting the Wear of the First or Second Roll

The first roll 110 may comprise a pattern 160 to be embossed on the web material 170. It is known to emboss a specific pattern 160 on the web material 170 such as a fibrous structure by passing the fibrous structure through a nip formed by the first and a second roll 110, 120 under thermal and pressure bonding conditions. In general, a pattern 165 to be embossed on the web material 170 may be provided only on the first roll 110 in form of protuberances on the first roll surface, while the second roll surface remains smooth and non-patterned. For instance, the first roll 110 may be patterned with diamond-shaped protuberances 161. Then, the first roll 110 may compress a fibrous structure against the second roll 120 which has a smooth and non-patterned surface. However, as the diamond-shaped protuberances 161 of the first roll 110 may contact the smooth surface of the second roll 120, the upper edges of the diamond-shaped protuberances 161 may wear down over time. The resulting embossed pattern 165 will start being less defined after a certain period of time.

In order to have the web material 170 with a high quality embossment or any other transformation, the wear of the first or second roll 110, 120 may be monitored.

The method may thus further comprise the step of detecting the wear of the first roll 110 by using the first non-contacting measuring device 141, and/or detecting the wear of the second roll 120 by using the second non-contacting measuring device 142.

The first and second non-contacting measuring device 141, 142 for detecting the wear of the first or second roll 110, 120 may also be selected from the group consisting of an inductive sensor, a capacitance sensor, an Eddy-current sensor, a laser triangulation displacement sensor, a confocal-chromatic sensor and combinations thereof.

Indeed, as the first and second non-contacting measuring device 141, 142 are able to measure the distance from the first and second non-contacting measuring device 141, 142 to the respective first and second roll 110, 120, the first and second non-contacting measuring device 141, 142 may be able to measure any changes of the diameter of the first and second roll 110, 120.

Advantageously, the first and second non-contacting measuring device 141, 142 for detecting the wear of the first or second roll 110, 120 may be positioned anywhere to detect the wear of the first and second roll 110, 120 as long as the first and second non-contacting measuring device 141, 142 do not interfere with the web material's 170 path. The first non-contacting measuring device 141 may be advantageously directed to a circumference of the first roll surface which may comprise the one or more protuberances of the first roll 110.

As shown in FIGS. 6A, 6B and 6B, the first and second non-contacting measuring device 141, 142 may be positioned respectively to the first and second roll 110, 120 apart from the web material's 170 path. Hence, the first and second non-contacting measuring device 141, 142 do not cause any interference with the web material's 170 path between the first and second roll 110, 120.

Wear may occur at different rates throughout the first and second roll surfaces, adversely affecting the pattern to be embossed which is provided on the first and/or second roll 110, 120. By positioning the first and second non-contacting measuring device 141, 142 respectively to the first and second roll 110, 120, the first and second non-contacting measuring device 141, 142 may be able to detect the most severe wear which occurs on the outward portions of the pattern 160. The more severe wear takes place on the outward portions of the pattern 160 due to a larger surface area coming into contact with the web material 170, which results in more force applied on the first and second roll 110, 120.

Method for Monitoring the Gap Between the First and Second Roll

When a material transformation is carried out by the first and second roll 110, 120, the gap 150 between the first and second roll 110, 120 is critical. If the gap 150 does not meet a target distance, the resulting transformation may be not satisfactory. Also, the first and second roll 110, 120 may undergo excessive wear.

The target distance depends on many factors: the nature of the first and second roll 110, 120, the type of the web material 170 (nonwoven, film . . . ), the thickness of the web material 170.

The first and second roll 110, 120 may have a smooth surface. The target distance may be the distance between the smooth surfaces of the first and second roll 110, 120. The target distance may be from 1 to 20 µm or from 1 to 10 µm or from 1 to 5 µm.

Alternatively, the first roll 110 may have a plurality of protuberances extending outwardly from its surface. Each protuberance may have an upper edge. The second roll 120 may have a smooth surface. The target distance may then be the distance between the upper edge of the uppermost protuberance of the first roll 110 and the smooth surface of the second roll 120. The target distance may be from 0 to 20 µm or from 0 to 5 µm or from 0 to 2 µm. The first and second roll 110, 120 may be used for cutting or embossing transformation for instance.

Alternatively, the first and second roll 110, 120 may have a plurality of protuberances extending outwardly from the surface of each first and second roll 110, 120. Each protuberance may have an upper edge. The target distance may be the distance between the upper edge of the uppermost protuberance of the first or second roll 110, 120 and the surface of the respective first or second roll 110, 120. The target distance is from 0 to 20 µm or from 0 to 10 µm or from 0 to 5 µm. The first and second roll 110, 120 may be used for any perforation transformation, intermeshing, embossing, bonding, cutting, etc.

The method may thus comprise the step of comparing the gap 150 to the target distance by using a controller. The resulted signal obtained after summing and calibrating the signals measured by the first and second non-contacting measuring device 141, 142 leads to the actual gap 150 between the first and second roll 110, 120. A controller 400 may compare the gap 150 to the target distance.

When a first and second non-contacting measuring device 141, 142 are used with the controller 400, a high degree of signal manipulation may be achieved, i.e. including the bandwidth optimization, noise filtering. The measured gap 150 is then accurate without further filtering or data manipulation.

The first and second non-contacting measuring device 141, 142 may be connected to the controller 400. The controller 400 may be connected to a computer via an Ethernet connection. For instance, the confocalDT 2451/2471 controller which is associated with the confocal-chromatic sensor is commercially available from MICRO-EPSILON MESSTECHNIK GmbH & Co, KG. The confocalDT 2451/2471 controller consists of a controller combined with a confocal-chromatic sensor, which are linked through a fiber optical cable. The controller is connected to an external Xenon light source in order to facilitate fast measurements of up to 70 kHz. The controller is easily configured via a web interface.

The method may further comprise the step that the first and/or second roll 110, 120 are repositioned such that the gap between the first and second roll 110, 120 is within the target distance.

Figure 7A:
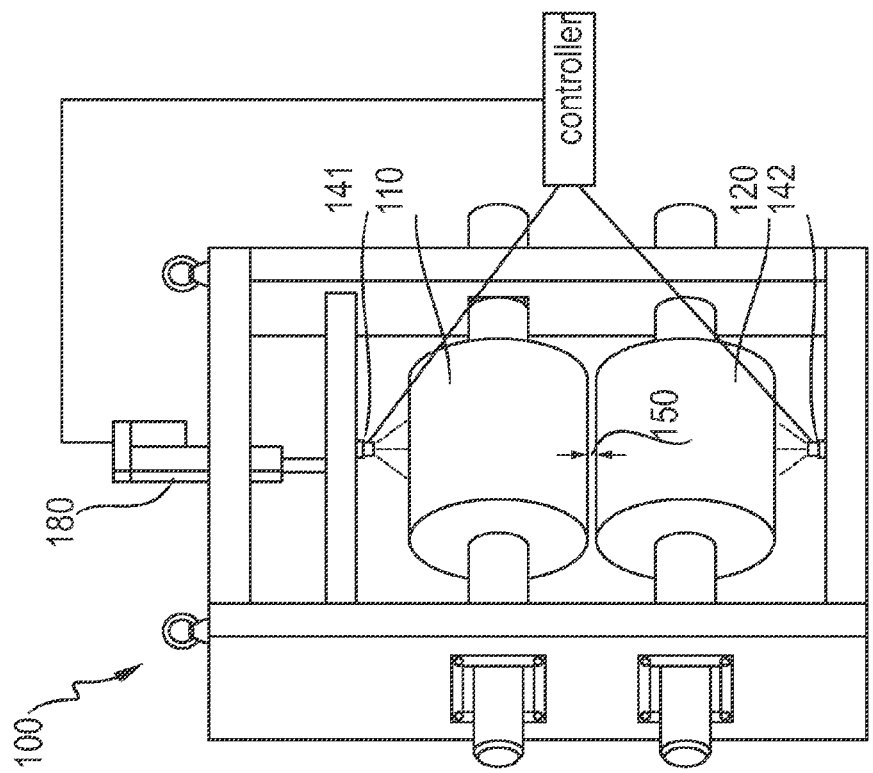
FIG. 7A is a perspective view of an exemplary embodiment of an apparatus comprising a closed-loop system comprising a controller and an actuator in a first motion.
Figure 7B:
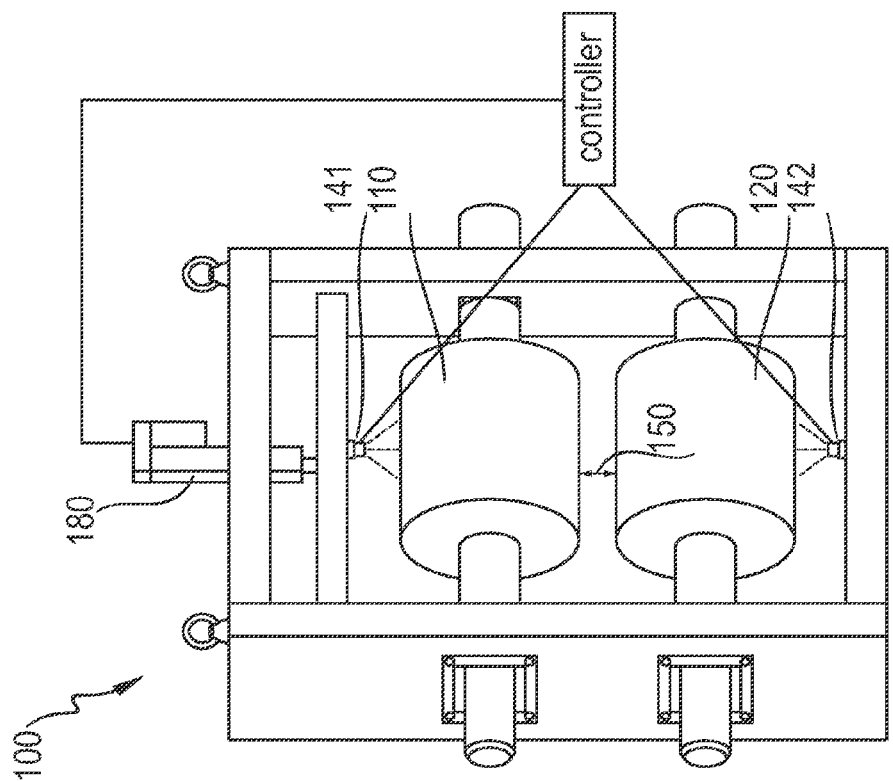
FIG. 7B is a perspective view of an exemplary embodiment of an apparatus comprising a closed-loop system comprising a controller and an actuator in a second motion.

The repositioning of the first and/or second roll 110, 120 may be made by using an actuator 180 which is selected from the group consisting of an electromechanical actuator, a pneumatic actuator, a hydraulic actuator, a linear actuator and combinations thereof, as exemplified in FIGS. 7A and 7B.

An electromechanical actuator is based on a rotary motion of an electric motor which is converted to a linear displacement. The electromechanical actuator has been found to be suitable for any types of operations. When the pneumatic actuator is not sufficient to reposition the position of the first and/or second roll 110, 120 in order to maintain the gap 150 from ±1 to 2 μm accuracy for a cutting operation, the electromechanical actuator may be used instead of the pneumatic actuator despite the cost of the electromechanical actuator.

Alternatively, the repositioning of the position of the first and/or second roll 110, 120 may be made by using a pneumatical actuator. The pneumatic actuator may convert the energy formed by some compressed air at a high pressure into either a linear or rotary motion. The pneumatical actuator may be thus able to reposition the position of the first and/or second roll 110, 120 in the sub-micron range when the gap ranges about 4 μm.

The pneumatic actuator may be advantageously used when the first and second roll 110, 120 comprise bearing rings and are intended to be used for bonding. When the first and second roll 110, 120 comprise bearing rings, the bearing rings have little surface area coming in contact with the pneumatic actuator, which enables the pneumatic actuator to move more easily with less force.

Alternatively, the repositioning of the position of the first and/or second roll 110, 120 may be facilitated by using a hydraulic actuator. The hydraulic actuator consists of a cylinder or fluid motor that uses the hydraulic power to facilitate a mechanical operation. The mechanical motion gives an output in terms of linear, rotary or oscillatory motion. Because liquid cannot be compressed, a hydraulic actuator can exert considerable force, but is limited in acceleration and speed.

Alternatively, the repositioning of the position of the first and/or second roll 110, 120 may be made by using an electric actuator. The electric actuator is powered by motor that converts the electrical energy to a mechanical torque. It is one of the cleanest and most readily available forms of actuator because it does not involve oil.

In the cases of thermal expansion or contraction of the first and/or second roll 110, 120, the changes of the temperature may induce a change in the geometry of the first and second roll 110, 120, especially a change in roll diameter. If the gap 150 between the first and second roll 110, 120 has increased beyond the target distance due to the contraction of the first and second roll 110, 120, this may adversely affect the transformation of the web material 170 passing through the gap 150 up to no transformation occurring on the web material 170 at all.

Also, if the gap 150 has decreased below the target distance due to the expansion of the first and second roll 110, 120, the first and second roll 110, 120 may come into contact with each other, which may lead to excessive wear of the first and second roll 110, 120 and/or damage to the web material 170.

However, the first and second non-contacting measuring device 141, 142 may be calibrated to work over a relatively broad temperature range. Also, the first and second non-contacting measuring device 141, 142 may comprise a temperature compensation system onboard in order to be less susceptible to any temperature changes.

The repositioning of the position of the first and/or second roll 110, 120 which may be made by using an actuator 180 in order that the gap 150 meets the target distance can be carried out without any need to interrupt the ongoing process.

Example

The following is an example according to the apparatus and method of the present invention in order to maintain a gap between the first and second roll within a single digit micron accuracy (1 μm).

The apparatus 100 comprises a first roll 110 which is an embossing roll having a patterned surface in relief and second roll 120 which is a smooth roll.

A first Eddy-current sensor 141 which is not connected to the first and second roll 110, 120 is securely screwed on a frame 180 in order to infer the position of the first roll 110. In a back to back orientation, a second Eddy-current sensor 142 which is not connected to the first and second roll 110, 120 is securely screwed on the frame 180 in order to infer the position of the second roll 120.

Each Eddy-current sensor has been purchased from MICRO-EPSILON MESSTECHNIK GmbH &. Co. KG under the reference eddyNCDT 3100 with the appropriate DT31000 universal single channel Eddy controller with an integrated Ethernet-surface.

An average gap is measured over the course of 200,000 rotations and then corrected. First, the desired target distance for the gap 150 is set manually offline.

The gap 150 is monitored by the first and second Eddy-current sensor 141, 142. Each of the Eddy-current sensors 141, 142 is zeroed with an appropriate software which is connected to the controller DT3100.

The method ensures the embossing roll to penetrate into the web material 170 at the intended depth by correcting the gap 150 with an actuator 500. The actuator 500 is an electromechanical actuator which has the following properties: 0.25 micron accuracy, with position based movements and can bear 24 kN of force (up to 74 kN).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of measuring a gap between a first and second roll, wherein the method comprises the steps of:
   providing a first and second roll having parallel axes of rotation, the first roll having a first position and the second roll having a second position, the first roll having a first surface and the second roll having a second surface;
   defining a gap between the first and second roll which meets a target distance between the first and second roll to allow a web material to pass through the gap;
   providing at least a first non-contacting measuring device and which measures a first distance from the first non-contacting measuring device to the first surface to infer the position of the first roll;
   inferring the gap between the first and second roll from the inferred position of the first roll;
   passing the web material between said first and second surfaces for a resulting transformation; and
   wherein the first non-contacting measuring device is selected from the group consisting of an inductive sensor, a capacitance sensor, an Eddy-current sensor, a laser triangulation displacement sensor, a confocal-chromatic sensor and combinations thereof.

2. The method according to claim 1 wherein the first and/or second roll are subjected to a thermal expansion or a thermal contraction during use.

3. The method according to claim 1 wherein the method further comprises the step of:
   detecting the wear of the first roll by using the first non-contacting measuring device, and/or
   detecting the wear of the second roll by using a second non-contacting measuring device.

4. The method according to claim 1 wherein the method further comprises the steps of:
   comparing the gap to a target distance for the gap by using a controller;
   repositioning the first and/or second roll such that the gap meets the target distance of the gap.

5. The method according to claim 4 wherein the first and second surfaces are smooth, and wherein the target distance is the distance between the smooth surfaces of the first and second roll, the target distance being from 1 to 20 µm.

6. The method according to claim 4 wherein the first surface has a plurality of protuberances extending outwardly therefrom, each protuberance having an upper edge, wherein the second surface is smooth and wherein the target distance is the distance between the upper edge of the uppermost protuberance of the first roll and the smooth surface of the second roll, the target distance being from 0 to 20 µm.

7. The method according to claim 4 wherein the first and second surfaces have a plurality of protuberances extending outwardly from the surface of each first and second roll, each protuberance having an upper edge, and wherein the target distance is the distance between the upper edge of the uppermost protuberance of the first or second roll and the surface of the respective first or second roll, and wherein the target distance is from 0 to 20 µm.

8. The method according to claim 4 wherein the first and/or second roll are repositioned such that the gap between the first and second roll is within the target distance, wherein repositioning is made by using an actuator which is selected from the group consisting of an electromechanical actuator, a pneumatic actuator, a hydraulic actuator, a linear actuator and combinations thereof.

9. A method of measuring a gap between a first and second roll, wherein the method comprises the steps of:
   providing a first and second roll having parallel axes of rotation, the first roll having a first position and the second roll having a second position, the first roll having a first surface and the second roll having a second surface;
   defining a gap between the first and second roll which meets a target distance between the first and second roll to allow a web material to pass through the gap;
   providing at least a first non-contacting measuring device and which measures a first distance from the first non-contacting measuring device to the first surface to infer the position of the first roll;
   providing at least a second non-contacting measuring device and which measures a second distance from the second non-contacting measuring device to the second roll to infer the position of the second roll;
   inferring the gap between the first and second roll from the inferred positions of the first and second roll;
   passing the web material between said first and second surfaces for a resulting transformation; and
   wherein the first and second non-contacting measuring device are selected from the group consisting of an inductive sensor, a capacitance sensor, an Eddy-current sensor, a laser triangulation displacement sensor, a confocal-chromatic sensor and combinations thereof.

10. The method according to claim 9 wherein the first and/or second roll are subjected to a thermal expansion or a thermal contraction during use.

11. The method according to claim 9 wherein the method further comprises the step of:
    detecting the wear of the first roll by using the first non-contacting measuring device, and/or
    detecting the wear of the second roll by using the second non-contacting measuring device.

12. The method according to claim 9 wherein the method further comprises the steps of:
    comparing the gap to a target distance for the gap by using a controller;
    repositioning the first and/or second roll such that the gap meets the target distance of the gap.

13. The method according to claim 12 wherein the first and second surfaces are smooth, and wherein the target distance is the distance between the smooth surfaces of the first and second roll, the target distance being from 1 to 20 µm.

14. The method according to claim 12 wherein the first roll has a plurality of protuberances extending outwardly from the first surface, each protuberance having an upper edge, wherein the second surface is smooth and wherein the target distance is the distance between the upper edge of the uppermost protuberance of the first roll and the smooth surface of the second roll, the target distance being from 0 to 20 µm.

15. The method according to claim 12 wherein the first and second surfaces each have a plurality of protuberances extending outwardly therefrom, each protuberance having an upper edge, and wherein the target distance is the distance between the upper edge of the uppermost protuberance of the first or second roll and the surface of the respective first or second roll, and wherein the target distance is from 0 to 20 µm.

16. The method according to claim 12 wherein the first and/or second roll are repositioned such that the gap between the first and second roll is within the target distance, wherein repositioning is made by using an actuator which is selected from the group consisting of an electromechanical actuator, a pneumatic actuator, a hydraulic actuator, a linear actuator and combinations thereof.

\* \* \* \* \*